United States Patent
Fujihara et al.

(10) Patent No.: US 7,258,704 B2
(45) Date of Patent: Aug. 21, 2007

(54) HYDROGEN GENERATOR AND FUEL CELL SYSTEM HAVING THE SAME

(75) Inventors: Seiji Fujihara, Amagasaki (JP); Kunihiro Ukai, Ikoma (JP); Kiyoshi Taguchi, Osaka (JP); Hidenobu Wakita, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 147 days.

(21) Appl. No.: 10/831,347

(22) Filed: Apr. 26, 2004

(65) Prior Publication Data

US 2004/0234827 A1  Nov. 25, 2004

(30) Foreign Application Priority Data

Apr. 24, 2003 (JP) ............................. 2003-119976
Jul. 15, 2003 (JP) ............................. 2003-274691

(51) Int. Cl.
*B01D 1/00* (2006.01)
(52) U.S. Cl. .................. 48/61; 48/94; 422/305; 422/285; 422/306; 422/308
(58) Field of Classification Search .......... 422/112, 422/198, 199, 211; 48/61, 76; 423/650, 423/651
See application file for complete search history.

(56) References Cited

U.S. PATENT DOCUMENTS

| 6,497,856 B1 | 12/2002 | Lomax, Jr. et al. |
| 6,632,409 B1 | 10/2003 | Kuwaba |
| 2001/0026777 A1* | 10/2001 | Negishi et al. ........... 422/112 |
| 2002/0081253 A1* | 6/2002 | Abe ........................ 422/211 |
| 2002/0150800 A1 | 10/2002 | Asou et al. |

FOREIGN PATENT DOCUMENTS

| CN | 1388791 | 1/2003 |
| EP | 1231665 | 8/2002 |
| EP | 1271679 | 1/2003 |
| EP | 1348481 | 10/2003 |
| JP | 06349510 A * | 12/1994 |
| JP | 2000 178007 | 6/2000 |
| JP | 2000 185901 | 7/2000 |

OTHER PUBLICATIONS

European Search Report dated Nov. 8, 2004.

* cited by examiner

*Primary Examiner*—Glenn Caldarola
*Assistant Examiner*—Vinit H. Patel
(74) *Attorney, Agent, or Firm*—Stevens, Davis, Miller & Mosher, LLP (57) ABSTRACT

A hydrogen generator of the present invention is provided with: a reformer for generating a reformed gas containing hydrogen from a feed material containing an organic compound at least containing carbon and hydrogen and water; a heater for heating the reformer to a temperature required for generating the reformed gas; a carbon monoxide reducing unit having a carbon monoxide reducing catalyst for reducing carbon monoxide contained in the reformed gas generated in the reformer; and a temperature detector for detecting at least one of a temperature of the reformed gas in the carbon monoxide reducing unit and a temperature of the carbon monoxide reducing catalyst, wherein an amount of the feed material to be supplied to the reformer is controlled based on a comparison between a detected temperature detected by the temperature detector and a reference temperature set in accordance with the amount of the feed material.

9 Claims, 5 Drawing Sheets

HYDROGEN GENERATOR AND FUEL CELL SYSTEM HAVING THE SAME

BACKGROUND OF THE INVENTION

1. Field of the Invention

The present invention relates to a hydrogen generator for generating hydrogen using an organic compound such as methane, town gas, propane, gasoline, and alcohol, and a fuel cell system for generating power by using hydrogen as a fuel.

2. Description of the Related Art

A fuel cell cogeneration system (hereinafter referred to as fuel cell system), which is excellent in power generation efficiency and overall efficiency, has heretofore been noted as a distributed power generating system capable of effectively using energy.

Various types of fuel cells are usable in the fuel cell system. For example, a phosphoric acid fuel cell has been practically used as the fuel cell. A solid polymer fuel cell, for example, is under development for its practical use.

Well, many of the fuel cells currently used in the fuel cell system generate power by using hydrogen as a fuel. However, hydrogen-supplying means has not been developed as infrastructure. Accordingly, in order to obtain predetermined power by operating the fuel cell system, a hydrogen generator is installed in a place of installation of the fuel cell system so that the thus-installed hydrogen generator generates hydrogen to be supplied to the fuel cell. Therefore, almost all of the fuel cell systems have the hydrogen generator therein.

The hydrogen generator usually generates hydrogen to be supplied to the fuel cell by using a steam reforming method which is one of known hydrogen generation methods. With the steam reforming method, hydrogen is generated by mixing a hydrocarbon-based material or an alcohol-based material (hereinafter referred to as feed material) and water and then subjecting the mixture of the feed material and water to a chemical reaction under a high temperature using a predetermined reaction catalyst. The chemical reaction used in the steam reforming method is called a steam reforming reaction. And, the reaction catalyst used in the steam reforming reaction is called a reforming catalyst. The reforming catalyst is provided inside a reformer of the hydrogen generator, and the steam reforming reaction is performed in the reformer. After the steam reforming reaction is performed in the reformer, a gas (hereinafter referred to as reformed gas) which contains the thus-generated hydrogen and is in a high temperature state is discharged from the reformer. In addition, a natural gas, a liquid propane gas (LPG), naphtha, gasoline, kerosene, and the like are favorably used as the hydrocarbon-based material in the steam reforming method.

Carbon monoxide is usually contained as a sub-component in the reformed gas discharged from the reformer of the hydrogen generator. More specifically, the reformed gas contains hydrogen as a main component and about 10% to 15% of carbon monoxide as a sub-component. Accordingly, the hydrogen generator is provided with a shifter having a predetermined reaction catalyst in addition to the reformer. Hydrogen is generated in the shifter through a chemical reaction of carbon monoxide with water under a predetermined temperature condition, thereby increasing a hydrogen concentration of the reformed gas. The chemical reaction for generating hydrogen from carbon monoxide and water in the shifter is called a water gas shift reaction. And, a reaction catalyst used in the water gas shift reaction is called a shift catalyst. Thanks to the water gas shift reaction of carbon monoxide with water in the shifter, a carbon monoxide concentration in the reformed gas is reduced to about 0.5%.

Though the carbon monoxide contained in the reformed gas is reduced to about 0.5% in the shifter as mentioned above, an electrode catalyst provided inside the fuel cell is poisoned by the remaining carbon monoxide. Such poisoning is an unignorable problem particularly when the solid polymer fuel cell is used as the fuel cell. Therefore, in the case of supplying the reformed gas to the fuel cell which is easily poisoned, such as the solid polymer fuel cell, it is necessary to reduce the carbon monoxide concentration in the reformed gas to be supplied to the solid polymer fuel cell to 100 ppm or less, preferably to 10 ppm or less. Accordingly, in addition to the reformer and the shifter, the hydrogen generator is usually provided with a purifier having a predetermined reaction catalyst. Remaining carbon monoxide and oxygen in the air is subjected to a chemical reaction in the purifier to generate carbon dioxide, thereby reducing carbon monoxide remaining in the reformed gas. The chemical reaction for generating carbon dioxide from carbon monoxide and oxygen in the purifier is called a selective oxidation reaction. And, the reaction catalyst used in the selective oxidation reaction is called a purifying catalyst. The carbon monoxide concentration in the reformed gas is reduced to 100 ppm or lowers by the selective oxidation reaction of carbon monoxide with oxygen in the purifier.

The high quality reformed gas which is sufficiently reduced in carbon monoxide, rich in hydrogen, and ready to be supplied to the solid polymer fuel cell or the like is discharged from the purifier of the hydrogen generator and then supplied to the fuel cell via a predetermined reformed gas piping. In the fuel cell, hydrogen contained in the reformed gas supplied from the hydrogen generator is used as the fuel, whereby power generation is performed.

Now, in the fuel cell system, adjustment of an amount of the reformed gas to be supplied from the hydrogen generator to the fuel cell is ordinarily achieved by adjusting an amount of the feed material to be supplied to the reformer of the hydrogen generator. More specifically, in the case where the amount of the feed material supplied to the reformer is large, the amount of the reformed gas supplied from the hydrogen generator to the fuel cell is large. In contrast, when the amount of the feed material supplied to the reformer is small, the amount of the reformed gas supplied from the hydrogen generator to the fuel cell is small. Accordingly, in the case where a power generation amount of the fuel cell is small, i.e., when the amount of the reformed gas supplied from the hydrogen generator to the fuel cell is small, the amount of the feed material supplied to the reformer is usually small. In this case, since the amount of the feed material supplied to the reformer is small, the amount of the reformed gas supplied from the reformer to the shifter is also small. Further, when the amount of the reformed gas supplied to the shifter is small, heating of the shift catalyst by the reformed gas is reduced, a heat generation rate of the water gas shift reaction in the shift catalyst is lowered, and a heat discharge rate from the hydrogen generator is increased, resulting in a reduction in temperature of the shift catalyst.

In the case where the temperature of the shift catalyst in the shifter is lowered, it is sometimes impossible to sufficiently reduce carbon monoxide contained in the reformed gas. This is because the lowered temperature of the shift catalyst causes the water gas shift reaction in the shifter to progress with insufficient yield. In this case, it is impossible to sufficiently reduce the carbon monoxide concentration in the reformed gas in the succeeding process in the purifier, so that the reformed gas to be supplied to the fuel cell is deteriorated in quality. Therefore, in order to stably supply the high quality reformed gas which is sufficiently reduced in carbon monoxide concentration from the hydrogen generator to the fuel cell, it is necessary to sufficiently reduce carbon monoxide contained in the reformed gas in the shifter which is the initial carbon monoxide reducing unit in the hydrogen generator. Further, it is necessary that the temperature of the shift catalyst provided inside the shifter must be kept at a predetermined temperature which enables the water gas shift reaction to be performed with satisfactory yield.

Then, there has been proposed a hydrogen generator wherein a noble metal catalyst is used as a shift catalyst and an air inlet is provided upstream of a shifter thereof, which is capable of maintaining a temperature of the shift catalyst to a predetermined value by the use of heat generated by the reaction of carbon monoxide or hydrogen in the reformed gas with oxygen in air by supplying the air from the air inlet (see, for example, Japanese Unexamined Patent Publication No. 2000-178007, which will hereinafter be referred to as the first conventional example). Also, a hydrogen generator which is provided with a predetermined temperature adjuster and capable of keeping a temperature of a shift catalyst at a predetermined value by adjusting the temperature of a shifter using the temperature adjuster has been proposed (see, for example, Japanese Unexamined Patent Publication No. 2000-185901, which will hereinafter be referred to as the second conventional example).

According to the first and the second conventional examples, the temperature of the shift catalyst provided in the shifter is always kept at the predetermined temperature, which enables the water gas shift reaction to progress. Therefore, in the shifter of the hydrogen generator, even when the amount of the feed material supplied to the reformer is small, the carbon monoxide concentration in the reformed gas is sufficiently reduced.

However, with the first conventional example wherein the air is supplied from the air inlet to the shifter to keep the temperature of the shift catalyst at the predetermined temperature, the air is continuously supplied from the air inlet to the shifter for the purpose of keeping the temperature of the shift catalyst at the predetermined temperature; therefore, hydrogen contained in the reformed gas supplied from the reformer reacts with oxygen contained in the air supplied from the air inlet to be wasted, resulting in deterioration in hydrogen generation efficiency of the hydrogen generator.

Also, with the second conventional example wherein the temperature adjuster is provided in the shifter to adjust the temperature of the shift catalyst to the predetermined value, components constituting the temperature adjustor are required to undesirably increase a production cost of the hydrogen generator. Further, with this conventional example, the temperature adjustment control entails complication in operation.

The optimum temperature of the shift catalyst for progressing the water gas shift reaction with satisfactory yield changes depending on the amount of the reformed gas introduced into the shifter, i.e., on the amount of the feed material supplied to the reformer. More specifically, when a change in amount of the reformed gas to the shifter is small, the optimum temperature of the shift catalyst is substantially constant. But, when the change in amount of the reformed gas to the shifter is large, the optimum temperature of the shift catalyst changes by a large scale. Accordingly, in the case where the amount of the feed material supplied to the reformer is largely increased in accordance with the amount of power to be generated by the fuel cell, the first and the second conventional examples, wherein the temperature of the shift catalyst is kept at the predetermined value, might fail to satisfactorily reduce or might scarcely reduce carbon monoxide contained in the reformed gas in the shifter.

SUMMARY OF THE INVENTION

The present invention has been accomplished in view of the above problems, and an object thereof is to provide a hydrogen generator capable of generating a high quality reformed gas which is sufficiently reduced in carbon monoxide and rich in hydrogen efficiently in accordance with a change in power generation amount of a fuel cell as well as to provide a fuel cell system having the hydrogen generator.

In order to attain the object, a hydrogen generator of the invention comprises: a reformer for generating a reformed gas containing hydrogen from a feed material comprising an organic compound containing at least carbon and hydrogen and water; a heater for heating the reformer to a temperature required for generating the reformed gas; a carbon monoxide reducing unit having a carbon monoxide reducing catalyst for reducing carbon monoxide contained in the reformed gas generated in the reformer; and a temperature detector for detecting at least one of a temperature of the reformed gas in the carbon monoxide reducing unit and a temperature of the carbon monoxide reducing catalyst, wherein an increase in amount of the feed material to be supplied to the reformer is controlled based on a comparison between a detected temperature detected by the temperature detector and a reference temperature set depending on the amount of the feed material (claim 1). With such constitution, it is possible to obtain the high quality reformed gas which is sufficiently reduced in carbon monoxide concentration.

In the above case, when the detected temperature is lower than the reference temperature as a result of the comparison, the amount of the feed material to be supplied to the reformer is not increased. When the detected temperature is equal to or higher than the reference temperature, the amount of the feed material is increased (claim 2). With such constitution, in the case of increasing a power generation amount of the fuel cell, it is possible to supply the high quality reformed gas sufficiently reduced in carbon monoxide concentration in an amount which is in accordance with the increase in power generation.

In this case, when the detected temperature is lower than the reference temperature, control is performed so that the detected temperature reaches a temperature equal to or higher than the reference temperature, whereby the amount of the feed material is increased at the time when the detected temperature reaches the temperature equal to or higher than the reference temperature (claim 3). With such constitution, the supply of the reformed gas to the fuel cell is more stable since control is performed so that the detected temperature reaches the temperature equal to or higher than the reference temperature as required.

In this case, when the detected temperature is lower than the reference temperature, control is performed so that the detected temperature reaches a temperature equal to or higher than the reference temperature through an increase in heating calories in the heater (claim 4). With such constitution, it is possible to readily control the detected temperature by controlling an amount of a fuel supplied to the heater, such as a methane gas, when the power generation amount of the fuel cell is increased.

Alternatively, when the detected temperature is lower than the reference temperature, control is performed so that the detected temperature reaches a temperature equal to or higher than the reference temperature through a reduction in amount of water to be supplied to the reformer (claim 5). With such constitution, it is possible to readily control the detected temperature by controlling the amount of water to be supplied to the reformer when the power generation amount of the fuel cell is increased.

Alternatively, the hydrogen generator may further comprise an oxidation gas supplying unit for supplying an oxidation gas to the carbon monoxide reducing unit, and control is performed so that the detected temperature reaches a temperature equal to or higher than the reference temperature through a supply of the oxidation gas from the oxidation gas supplying unit to the carbon monoxide reducing unit when the detected temperature is lower than the reference temperature (claim 6). With such constitution, it is possible to readily control the detected temperature by controlling the amount of the oxidation gas to be supplied to the carbon monoxide reducing unit, such as air, when the power generation amount of the fuel cell is increased.

In the above case, the carbon monoxide reducing catalyst is a shift catalyst for progressing a water gas shift reaction through which hydrogen and carbon dioxide are generated from carbon monoxide and water, and the carbon monoxide reducing unit is a shifter having the shift catalyst (claim 7). With such constitution, it is possible to reduce the carbon monoxide concentration in the reformed gas without changing the conventional constitution of the hydrogen generator.

In this case, a catalytic body in the shift catalyst comprises at least a noble metal and a metallic oxide of at least one element selected from cerium, zirconium, and aluminum (claim 8). With such constitution, it is possible to efficiently reduce the carbon monoxide concentration in the reformed gas.

In the above case, the carbon monoxide reducing catalyst is a carbon monoxide selective oxidation catalyst for subjecting carbon monoxide to a selective oxidation reaction, and the carbon monoxide reducing unit is a selective oxidation unit having the carbon monoxide selective oxidation catalyst (claim 9). With such constitution, too, it is possible to reduce the carbon monoxide concentration in the reformed gas without changing the conventional constitution of the hydrogen generator.

A fuel cell system of the invention comprises any one of the hydrogen generators defined in claims 1 to 9 and a fuel cell for generating power using hydrogen generated by the hydrogen generator and an oxidation gas, wherein the fuel cell system is configured to cause the hydrogen generator to increase the amount of the feed material to be supplied to the reformer when the detected temperature detected by the temperature detector reaches the temperature equal to or higher than the reference temperature, and thereby the fuel cell increases power generation amount (claim 10). With such constitution, it is possible to effectively prevent a reduction in output power of the fuel cell, thereby providing the fuel cell system excellent in power generation efficiency.

The above and other objects, characteristics, and advantages of the invention will become apparent from preferred embodiments described below with reference to accompanying drawings.

DESCRIPTION OF THE PREFERRED EMBODIMENTS

Embodiments of the present invention will hereinafter be described with reference to the drawings.

First Embodiment

Figure 1:
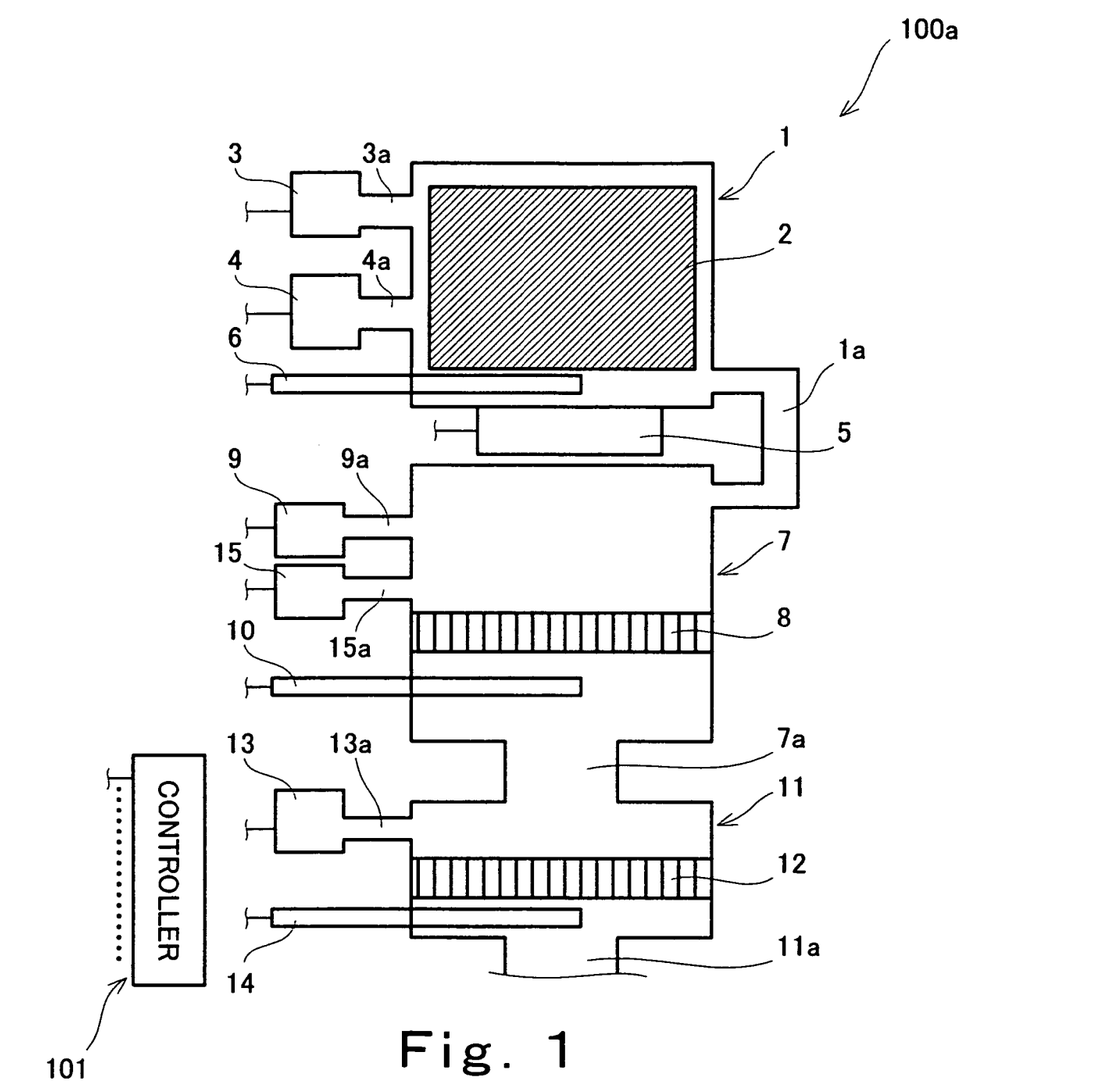
FIG. 1 is a schematic diagram showing a constitution of a hydrogen generator according to a first embodiment of the present invention.

FIG. 1 is a schematic diagram showing a constitution of a hydrogen generator according to a first embodiment of the invention. Note that the constitution of the hydrogen generator shown in FIG. 1 is extracted from a fuel cell system described later in this specification.

As shown in FIG. 1, a hydrogen generator 100a according to this embodiment has: a reformer 1 for generating hydrogen by way of a steam reforming reaction of a hydrocarbon-based material such as a natural gas, a liquid propane gas (LPG), naphtha, gasoline, and kerosene or a material containing at least carbon and hydrogen, which is represented by an alcohol-based material and the like such as methanol and the like, with water; a shifter 7 for shifting carbon monoxide which is discharged from the reformer 1 together with hydrogen into hydrogen by way of a water gas shift reaction of carbon monoxide with water; a purifier 11 for converting carbon monoxide which is discharged from the shifter 7 together with hydrogen into carbon dioxide by way of a selective oxidation reaction of carbon monoxide with oxygen; and a controller 101 for controlling operations of the reformer 1, the shifter 7, and the purifier 11.

The reformer 1 is provided with a feed material supplying unit 3 for supplying thereto a feed material. The feed material supplying unit 3 is connected to a predetermined position of the reformer 1 via a feed material supplying piping 3a for delivering the feed material comprising an organic compound containing at least carbon and hydrogen, such as methane, a city gas, a natural gas, and alcohol as described above. A booster or the like may be used as the feed material supplying unit 3. The reformer 1 is provided also with a water supplying unit 4 for supplying thereto water required for a steam reforming reaction. The water supplying unit 4 is connected to a predetermined position of the reformer 1 via a water supplying piping 4a for delivering water from the water supplying unit 4 to the reformer 1. On the other hand, the reformer 1 has a reforming catalyst 2 for progressing the steam reforming reaction for generating hydrogen by using the feed material supplied from the feed material supplying unit 3 and water supplied from the water supplying unit 4. The reformer 1 is provided also with a heater 5 for heating and keeping the reforming catalyst 2 to a temperature required for progressing the steam reforming reaction. The reforming catalyst 2 is disposed at a position favorable as a place of reaction of the steam reforming reaction in the reformer 1, and the heater 5 is disposed at a position favorable for heating and keeping the reforming catalyst 2 in the reformer 1. Further, the reformer 1 has a temperature detector 6 for detecting a temperature of the reformed gas which is discharged after passing through the reforming catalyst 2 and contains hydrogen. The temperature detector 6 is disposed at a position favorable for detecting the temperature of the reformed gas discharged after passing through the reforming catalyst 2. In this embodiment, the temperature detector 6 is disposed at a predetermined position downstream of the reforming catalyst 2. Note that the position of the temperature detector 6 is not limited to the downstream position of the reforming catalyst 2, and the temperature detector 6 may be disposed at any position so far as it is possible to detect the temperature of the reformed gas in the reformer 1 or the temperature of the reforming catalyst 2 at the position. Extending from the reformer 1 to the shifter 7 is a reformed gas piping 1a for introducing the reformed gas discharged from the reformer 1 into the shifter 7.

The shifter 7 is provided with a water supplying unit 9 for supplying thereto water required for a water gas shift reaction. The water supplying unit 9 is connected to a predetermined position of the shifter 7 via a water supplying piping 9a for delivering water from the water supplying unit 9 to the shifter 7. The shifter 7 is provided also with an air supplying unit 15 for supplying thereto air (oxygen in the air) required for controlling a temperature of a shift catalyst 8 which will be described later in this specification. The air supplying unit 15 is connected to a predetermined position of the shifter 7 via an air supplying piping 15a for delivering the air from the air supplying unit 15 to the shifter 7. The shifter 7 has the shift catalyst 8 for progressing the water gas shift reaction. By the water gas shift reaction, hydrogen is generated using carbon monoxide contained in the reformed gas introduced thereinto via the reformed gas piping 1a from the reformer 1 and water supplied from the water supplying unit 9 and carbon monoxide in the reformed gas is reduced. A cordierite honeycomb coated with a Ce oxide carrying Pt is used as the shift catalyst 8. The shift catalyst 8 is disposed at a position favorable as a place of reaction of the water gas shift reaction in the shifter 7. Further, the shifter 7 has a temperature detector 10 for detecting a temperature of the reformed gas which is discharged after passing through the shift catalyst 8 and improved in hydrogen content. The temperature detector 10 is disposed at a position favorable for detecting the temperature of the reformed gas discharged after passing through the shift catalyst 8. In this embodiment, the temperature detector 10 is disposed at a predetermined position downstream of the shift catalyst 8. Note that the position of the temperature detector 10 is not limited to the downstream position of the shift catalyst 8, and the temperature detector 10 may be disposed at any position so far as it is possible to detect the temperature of the reformed gas in the shifter 7 or the temperature of the shift catalyst 8 at the position. Extending from the shifter 7 to the purifier 11 is a reformed gas piping 7a for introducing the reformed gas which is discharged from the shifter 7 and improved in hydrogen content into the purifier 11.

The purifier 11 is provided with an air supplying unit 13 for supplying thereto air (oxygen in the air) required for a selective oxidation reaction. The air supplying unit 13 is connected to a predetermined position of the purifier 11 via an air supplying piping 13a for delivering the air from the air supplying unit 13 to the purifier 11. In order to further reduce carbon monoxide contained in the reformed gas introduced thereinto via the reformed gas piping 7a from the shifter 7, the purifier 11 has a purifying catalyst 12 for progressing the selective oxidation reaction. By the selective oxidation reaction, carbon dioxide is generated from carbon monoxide contained in the reformed gas and oxygen supplied from the air supplying unit 13. In this embodiment, a cordierite honeycomb coated with alumina carrying Pt and Ru is used as the purifying catalyst 12. The purifying catalyst 12 is disposed at a position favorable as a place of reaction of the selective oxidation reaction in the purifier 11. Further, the purifier 11 has a temperature detector 14 for detecting a temperature of the reformed gas which is discharged after passing through the purifying catalyst 12 and further improved in hydrogen content. The temperature detector 14 is disposed at a position favorable for detecting the temperature of the reformed gas discharged after passing through the purifying catalyst 12. In this embodiment, the temperature detector 14 is disposed at a predetermined position downstream of the purifying catalyst 12. Note that the position of the temperature detector 14 is not limited to the downstream position of the purifying catalyst 12, and the temperature detector 14 may be disposed at any position so far as it is possible to detect the temperature of the reformed gas in the purifier 11 or the temperature of the purifying catalyst 12 at the position. Extending from the purifier 11 is a reformed gas piping 11a for discharging the reformed gas which is discharged from the purifier 11 and further improved in hydrogen content thanks to the selective oxidation reaction. The reformed gas piping 11a is connected to a fuel cell not shown in FIG. 1. The reformed gas is supplied to the fuel cell via the reformed gas piping 11a to be used for generating power. In addition, when it is unnecessary to reduce the carbon monoxide concentration in the reformed gas to, for example, 100 ppm or lower, it is unnecessary to install the purifier 11.

Control wirings extending from the control unit 101 are connected to the reformer 1, the shifter 7, and the purifier 11 constituting the hydrogen generator 11a as well as to the components of the reformer 1, the shifter, and the purifier 11.

Hereinafter, basic hydrogen generating operations of the hydrogen generator of this embodiment will be described. Note that the methane gas is used as the hydrocarbon-based material in the following description.

In the case of generating hydrogen by operating the hydrogen generator 100a, the methane gas which is the feed material is supplied to the reformer 1 from the feed material supplying unit 3 simultaneously with the supply of water from the water supplying unit 4. Here, by operating the heater 5, the reforming catalyst 2 is heated to a predetermined temperature which is sufficient for progressing the steam reforming reaction. In this embodiment, control on the temperature of the reforming catalyst 2 is performed in such a manner that the temperature detected by the temperature detector 6 becomes 650° C. by operating the heater 5. Then, the steam reforming reaction of the methane gas with water progresses to generate hydrogen in the reformer 1. However, with the steam reforming reaction of the methane gas with water, about 10% to 15% of carbon monoxide and a very small amount of carbon dioxide are generated in addition to hydrogen. Here, it is necessary to reduce carbon monoxide because it poisons an electrode catalyst disposed inside the fuel cell. Therefore, the reformed gas discharged from the reformer 1 is introduced into the shifter 7 via the reformed gas piping 1a to reduce a carbon dioxide concentration in the reformed gas in the shifter 7.

After the reformed gas is introduced into the shifter 7 via the reformed gas piping 1a, the carbon monoxide concentration in the reformed gas is reduced in the shifter 7 through the water gas shift reaction by which carbon monoxide reacts with water to generate hydrogen and carbon dioxide. Water required for the water gas shift reaction is supplied from the water supplying unit 9. Here, it is necessary to keep the temperature of the shift catalyst 8 at a predetermined value. Such temperature control is effected by: heating the shift catalyst 8 with the reformed gas which is introduced from the reformer 1 and has a high temperate; heating the shift catalyst 8 with a reaction heat generated by the water gas shift reaction; and/or cooling the shift catalyst 8 with water supplied from the water supplying unit 9 as required. Owing to the water gas shift reaction of carbon monoxide with water in the shifter 7, the carbon monoxide concentration in the reformed gas is reduced to about 0.3% to 1%.

The reformed gas of which the carbon monoxide concentration is reduced to about 0.3% to 1% in the shifter 7 is then introduced into the purifier 11 via the reformed gas piping 7a. In the case of further reducing the carbon monoxide concentration in the purifier 11, a predetermined amount of air is supplied from the air supplying unit 13 to the purifier 11. After that, the selective oxidation reaction of carbon monoxide contained in the introduced reformed gas with oxygen contained in the supplied air progresses in the purifier 11 to generate carbon dioxide. That is to say, carbon monoxide contained in the reformed gas is consumed due to the selective oxidation reaction, so that the carbon monoxide concentration in the reformed gas is further reduced. Owing to the selective oxidation reaction of carbon monoxide with oxygen in the purifier 11, the carbon monoxide concentration in the reformed gas is reduced to about 100 ppm or lower. In addition, the carbon monoxide concentration is reduced to 10 ppm or lower depending on the type of the fuel cell provided in the fuel cell system. The high quality reformed gas which is further reduced in carbon monoxide concentration in the purifier 11 is then supplied to the fuel cell not shown in FIG. 1 via the reformed gas piping 11a. In the fuel cell, the reformed gas supplied thereto via the reformed gas piping 11a is used for generating power.

The operations of the reformer 1, the shifter 7, and the purifier 11 constituting the hydrogen generator 100a as well as the operations of the components of the reformer 1, the shifter 7, and the purifier 11 are controlled by the controller 101 as required.

An optimum temperature of the shift catalyst 8 for progressing the water gas shift reaction with good yield in the shifter 7 depends greatly on an amount of the reformed gas introduced into the shifter 7, i.e., on an amount of the feed material supplied to the reformer 1. For instance, when the amount of the reformed gas introduced into the shifter 7 is small, the optimum temperature for efficiently progressing the water gas shift reaction of the shift catalyst 8 is relatively low. However, when the amount of the reformed gas introduced into the shifter 7 is large, it is necessary that the optimum temperature for efficiently progressing the water gas shift reaction of the shift catalyst 8 is high. Therefore, in the case where the amount of the feed material supplied to the reformer 1 is increased to increase the amount of the reformed gas supplied to the shifter 7 due to an increase in power consumption of a load such as an electric appliance or the like connected to the fuel cell system (not shown in FIG. 1), carbon monoxide contained in the reformed gas might not be sufficiently reduced in the shifter 7 with the hydrogen generating method wherein the temperature of the shift catalyst 8 is kept at a predetermined value. Particularly, when the power consumption of load is increased by a large scale to largely increase the amount of the feed material supplied to the reformer 1 and to largely increase the amount of the reformed gas supplied to the shifter 7, it is quite likely that carbon monoxide contained in the reformed gas will be scarcely reduced. In such cases, it is impossible to supply the high quality reformed gas to the fuel cell since a concentration of carbon monoxide contained in the reformed gas is not sufficiently reduced or scarcely reduced in the shifter 7. Hereinafter, characteristics of the water gas shift reaction for generating hydrogen from carbon monoxide and water will be described in detail with reference to the drawings.

Figure 2:
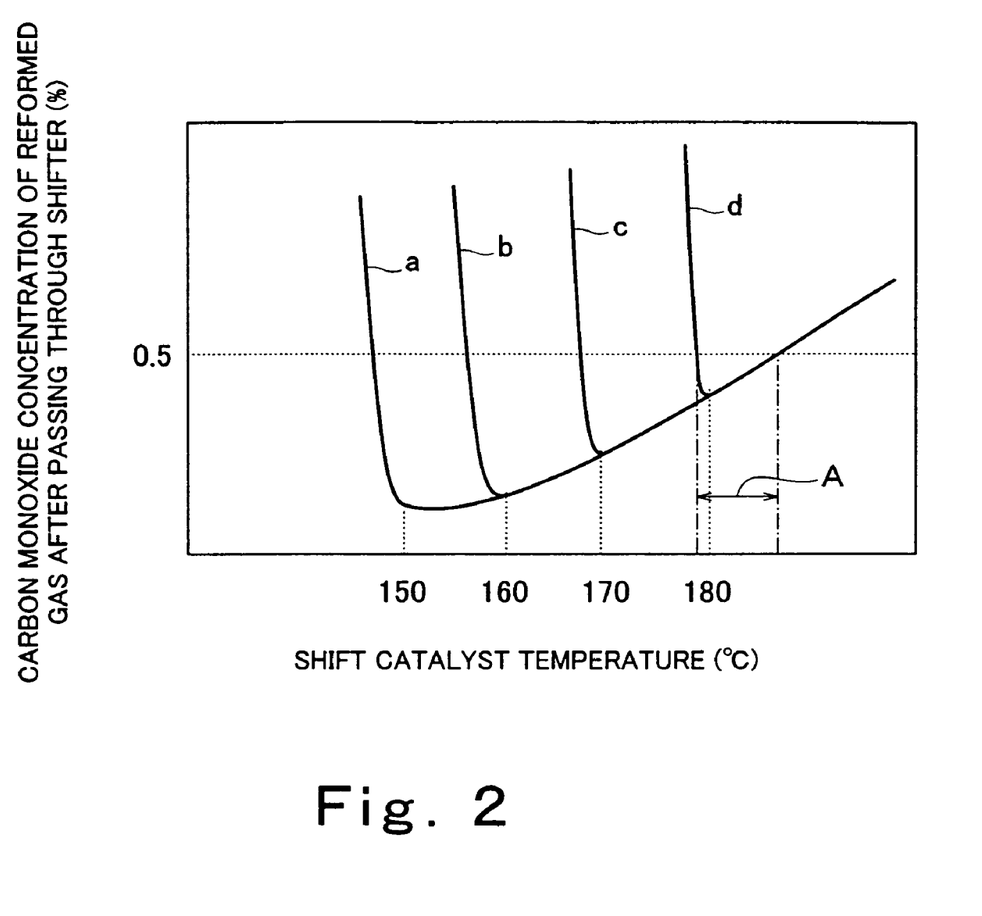
FIG. 2 is a graph showing a relationship between a shift catalyst temperature for a feed material amount and a carbon monoxide concentration in a reformed gas after passing through a shifter.

FIG. 2 is a graph showing a relationship between the shift catalyst temperature for a feed material amount and the carbon monoxide concentration in the reformed gas after passing through the shifter. In FIG. 2, the vertical axis indicates the carbon monoxide concentration (%) in the reformed gas after passing through the shifter, and the horizontal axis indicates the temperature (° C.) of the shift catalyst in the shifter. Also, the curve a indicates the relationship when the feed material amount is 1.0 NL/min.; the curve b indicates the relationship when the feed material amount is 2.0 NL/min.; the curve c indicates the relationship when the feed material amount is 3.0 NL/min.; and the curve d indicates the relationship when the feed material amount is 4.0 NL/min.

As shown in FIG. 2, the carbon monoxide concentration in the reformed gas after the water gas shift reaction in the shifter 7 depends on the temperature of the shift catalyst 8 and the amount of the feed material. For instance, in the case where the amount of the feed material supplied to the reformer 1 is small as indicated by the curve a (1.0 NL/min.), carbon monoxide is effectively reduced even when the shift catalyst 8 is in a low temperature state (150° C., for example). In turn, in the case where the amount of the feed material supplied to the reformer 1 is large as indicated by the curve d (4.0 NL/min.), carbon monoxide is scarcely reduced when the shift catalyst 8 is in the low temperature state (170° C. or lower, for example).

That is to say, even when the temperature of the shift catalyst 8 is lowered due to the reduction in amount of the reformed gas supplied from the reformer 1 to the shifter 7 which is achieved by reducing the amount of the feed material supplied to the reformer 1 in response to the reduction in power generation of the fuel cell, it is possible to sufficiently reduce the carbon monoxide concentration in the reformed gas provided that the amount of the feed material supplied to the reformer 1 is 1.0 NL/min. (curve a) and the temperature of the shift catalyst 8 is 150° C. More specifically, in the case where the carbon monoxide concentration in the reformed gas after the water gas shift reaction in the shifter 7 is 0.5% or lower as indicated by the dotted line in FIG. 2, it is possible to achieve the desired carbon monoxide concentration when the temperature of the shift catalyst 8 is in the range of about 150° C. to about 180° C. Also, when the amount of the feed material supplied to the reformer 1 is 2.0 NL/min. (curve b), the effective range of the temperature of the shift catalyst 8 is from about 160° C. to about 180° C. Also, when the amount of the feed material supplied to the reformer 1 is 3.0 NL/min. (curve c), the effective range of the temperature of the shift catalyst 8 is from about 170° C. to about 180° C. Also, when the amount of the feed material supplied to the reformer 1 is 4.0 NL/min. (curve d), the effective range of the temperature of the shift catalyst 8 is the range A shown in FIG. 2. However, in the case where the amount of the feed material supplied to the reformer 1 has become 3.0 NL/min. (curve c) in accordance with the reduction in power generation amount of the fuel cell and the temperature of the shift catalyst 8 has been reduced to lower than 180° C. along with the reduction in amount of the feed material, the carbon monoxide concentration in the reformed gas undesirably exceeds the target value of 0.5% when the amount of the feed material supplied to the reformer 1 is increased to 4.0 NL/min. (curve d), for example, in response to an increase in power generation amount of the fuel cell unless the temperature of the shift catalyst 8 is immediately raised to a temperature in the temperature range A. Therefore, when it is required to increase the amount of the feed material to be supplied to the reformer 1 of the hydrogen generator 100$a$ in accordance with the increase in power generation amount of the fuel cell, it is necessary to adjust in advance of the increase in amount of the feed material the temperature of the shift catalyst 8 to be in the temperature range optimum for the amount of the feed material to be supplied after the increase.

In view of the above, in this embodiment, in the case of coping with the increase in power generation amount of the fuel cell, the shift catalyst 8 is heated before increasing the amount of the feed material to be supplied to the reformer 1 of the hydrogen generator 100$a$ in such a manner that the air is supplied from the air supplying unit 15 to the shifter 7 until the temperature of the shift catalyst 8 reaches the optimum temperature (hereinafter referred to as reference temperature) for progressing the water gas shift reaction with good yield after the increase in amount of the feed material, and then the amount of the feed material to be supplied to the reformer 1 is increased after the temperature of the shift catalyst 8 has reached the reference temperature. Also, after the temperature of the shift catalyst 8 has reached the reference temperature, the air supply from the air supplying unit 15 to the shifter 7 is stopped. Hereinafter, an example of the operations of the hydrogen generator 100$a$ in coping with the increase in power generation amount of the fuel cell will be described with reference to the drawings.

Figure 4:
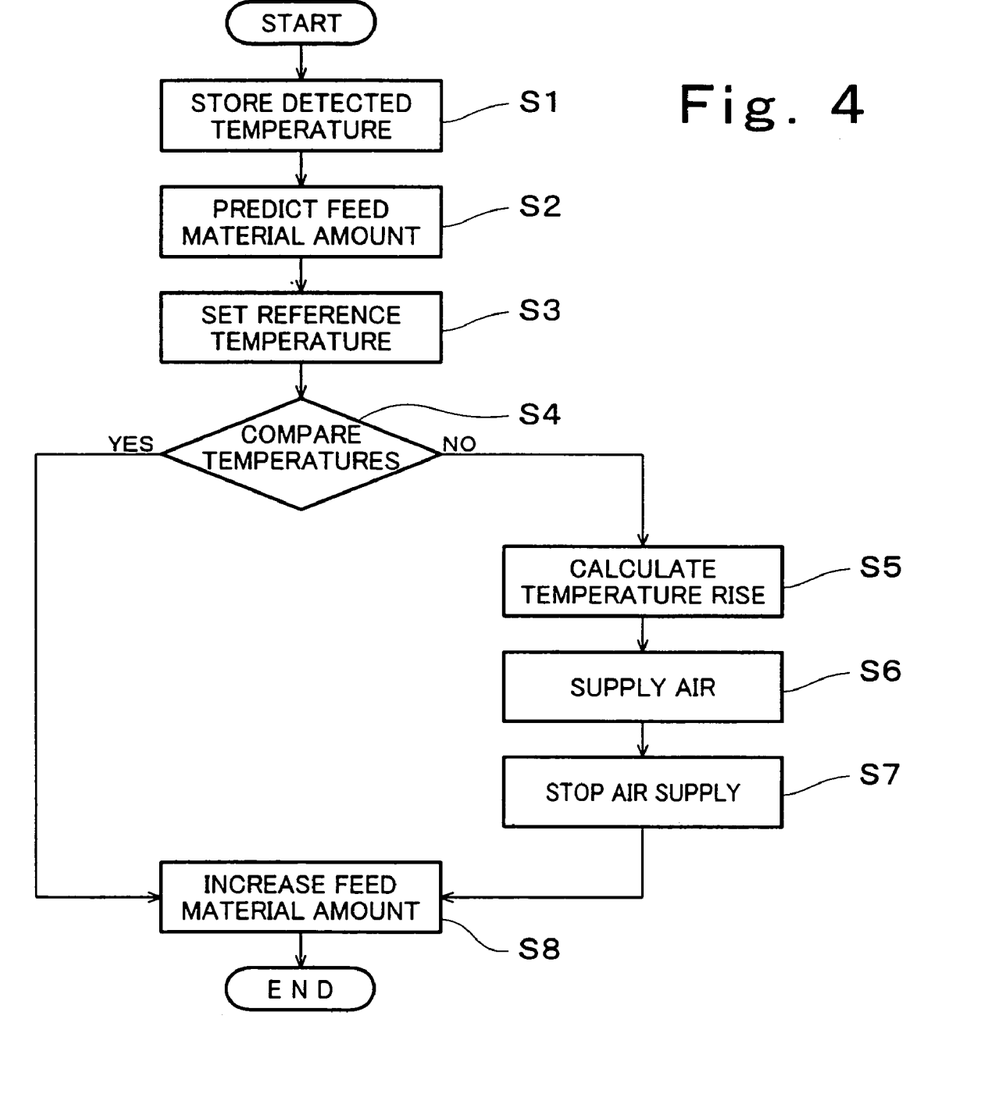
FIG. 4 is a flowchart showing an example of operation of the hydrogen generator in response to an increase in amount of power generation of a fuel cell.

FIG. 4 is a flowchart showing the example of the operations of the hydrogen generator in coping with the increase in power generation amount of the fuel cell.

Referring to FIGS. 1, 2, and 4, in the case where the load on the fuel cell is low for a long period of time, the power generation amount of the fuel cell is small for the long period of time. In such case, because the amount of the feed material supplied to the reformer 1 of the hydrogen generation 100$a$ is small, the temperature of the shift catalyst 8 in the shifter 7 to which the reformed gas is supplied from the reformer is lowered. Here, the temperature detector 10 of the shifter 7 detects a temperature of the reformed gas passing through the shift catalyst 8, and the detected temperature (hereinafter referred to as detected temperature) is stored in a storage unit of the controller 101 (Step S1). For instance, when the detected temperature of the reformed gas passing through the shift catalyst 8, which is detected by the temperature detection unit 10, is 170° C., the detected temperature is then stored in the storage unit of the controller 101. Note that the temperature of the shift catalyst 8 is detected through the detection of the reformed gas temperature in this embodiment because the reformed gas temperature detected by the temperature detector 10 is close to the temperature of the shift catalyst 8.

In turn, in the case where the load on the fuel cell changes from a lower load to a higher load, before increasing the power generation amount of the fuel cell in response to the change in load, the amount of the feed material to be supplied to the reformer 1 of the hydrogen generator 100$a$ is predicted by the controller 101 (Step S2). For instance, the controller 101 predicts that the amount of the feed material to be supplied to the reformer should be increased from 3.0 NL/min. to 4.0 NL/min. in accordance with the increase in power generation amount of the fuel cell. The prediction of the amount of the feed material is based on a reaction formula of the power generation.

Next, after the proper amount of the feed material to be supplied to the reformer is predicted in accordance with the increase in power generation amount of the fuel cell, the controller 101 sets a reference temperature depending on the predicted proper amount (Step S3). At this time point, data for the graph shown in FIG. 2, for example, have been stored in the storage unit of the controller 101. In the case where a desired carbon monoxide concentration in the reformed gas after passing through the shifter 7 is 0.5% or lower, the reference temperature set by the controller 101 is in the temperature range A in the curve d shown in FIG. 2 (the amount of the feed material supplied to the reformer is 4.0 NL/min.). In view of the fact that the water gas shift reaction progressing in the shifter 7 is an exothermic reaction, it is desirable that the reference temperature is set as a temperature of a low temperature portion in the temperature range A. It is apparent from FIG. 2 that the temperature of the low temperature portion in the temperature range A of FIG. 2 is the optimum temperature for effectively reducing the carbon monoxide concentration in the reformed gas. For example, as is apparent from FIG. 2, when it is predicted that the amount of the feed material to be supplied to the reformer 1 is 4.0 NL/min. (curve d), the reference temperature optimum for reducing carbon monoxide in the reformed gas is 180° C.

After the current detected temperature has been stored by Step S1, the reference temperature for coping with the increase in power generation amount of the fuel cell is set by Step S3. Then, the detected temperature and the reference temperature are compared with each other in the controller 101 (Step S4). Here, when the detected temperature is judged to be equal to or higher than the reference temperature (YES in Step S4), the controller 101 outputs to the feed material supplying unit 3 a control signal for increasing the amount of the feed material to be supplied to the reformer 1, so that the amount of the feed material to be supplied to the reformer 1 is increased (Step S8). In the case where the detected temperature is lower than the reference temperature (NO in Step S4), a temperature difference between the detected temperature and the reference temperature is calculated based on the comparison in the controller 101, so that a required temperature rise amount of the shift catalyst 8 is calculated (Step S5). For instance, when the detected temperature is 170° C. and the reference temperature is 180° C., it is calculated that the required temperature rise of the shift catalyst 8 is 10° C.

When the temperature rise in the shift catalyst 8 responsive to the increase in power generation amount of the fuel cell is calculated, the air is supplied from the air supplying unit 15 to the shifter 7 until the temperature detected by the temperature detector 10 reaches the temperature corresponding to the calculated temperature rise (Step S6). Note that the amount of air supplied from the air supplying unit 15 to the shifter 7 is set to 0.5 NL/min. Thus, hydrogen and carbon monoxide in the reformed gas react with oxygen in the supplied air in the shift catalyst 8 to raise the temperature of the shift catalyst 8 immediately. That is to say, the detected temperature detected by the temperature detection unit 10 has reached the reference temperature.

After the detected temperature detected by the temperature detector 10 has reached the reference temperature of, for example, 180° C. owing to the temperature rise of the shift catalyst 8 achieved by the air supply from the air supplying unit 15 to the shifter 7, the air supply from the air supplying unit 15 to the shifter 7 is stopped in order to prevent hydrogen from being wasted by the reaction of hydrogen with oxygen in the shifter 7 (Step S7). The temperature of the shift catalyst 8 is continuously monitored by the temperature detector 10, and the air is supplied from the air supplying unit 15 to the shifter 7 as required when the temperature of the shift catalyst 8 is below the reference temperature. Thus, the temperature of the shift catalyst 8 is always kept at the reference temperature.

After the detected temperature detected by the temperature detector 10 has reached the reference temperature, the controller 101 outputs to the feed material supplying unit 3 a control signal for increasing the amount of the feed material, so that the amount of the feed material to be supplied to the reformer 1 is increased to an amount to be supplied to the reformer 1 in accordance with the increase in power generation amount of the fuel cell (Step S8). For instance, the amount of the feed material to be supplied to the reformer 1 is increased from 3.0 NL/min. to 4.0 NL/min. Thus, in the shifter 7, carbon monoxide in the reformed gas is effectively reduced even when the amount of the feed material supplied to the reformer is increased. Accordingly, the high quality reformed gas is supplied to the fuel cell in an amount sufficient for coping with the increase in power generation amount, so that the power generation responsive to the load on the fuel cell is efficiently performed.

The controller 101 controls the operations of the hydrogen generator 100a and the components of the hydrogen generator 100a as required.

Thus, by supplying the air from the air supplying unit 15 to the shifter 7 in such a manner as to change the temperature of the shift catalyst 8 to the reference temperature, the temperature of the shift catalyst 8 rises immediately to reach the reference temperature by the reaction heat generated by the reaction of hydrogen and carbon monoxide in the reformed gas with oxygen in the air in the shift catalyst 8 inside the shifter 7. After it is confirmed that the detected temperature detected by the temperature detector 10 is equal to the reference temperature which is optimum for progressing the water gas shift reaction with good yield, the amount of the feed material to be supplied to the reformer 1 is increased. Thus, carbon monoxide in the reformed gas is effectively reduced in the shifter 7. Also, since the air supply from the air supplying unit 15 to the shifter 7 is performed only when the increase in amount of the feed material is required, hydrogen in the shifter 7 is prevented from being consumed more than necessary. That is to say, it is possible to efficiently generate hydrogen in the hydrogen generator 100a.

In addition, though the air is supplied to the shifter 7 at the amount of 0.5 NL/min. in this embodiment, the amount is not limited thereto and can be set in accordance with a constitution of a hydrogen generator, a catalyst, and so forth to be used. Also, the air may be supplied with its amount being changed in accordance with a change in temperature of the shift catalyst 8.

Though the reference temperature is set to 180° C. by way of example in this embodiment, the reference temperature is not limited thereto and can be set in accordance with an increased amount of the feed material to be supplied to the reformer 1. Here, it is preferable that the reference temperature is set to a value which best reduces the carbon monoxide concentration in each of the curves a to d shown in FIG. 2. For instance, the reference temperature may preferably be about 160° C. when the amount of the feed material is 2.0 NL/min. (curve b) as shown in FIG. 2, while the reference temperature may preferably be about 170° C. when the amount of the feed material is 3.0 NL/min. With such reference temperature settings, it is possible to most efficiently reduce the carbon monoxide concentration in the reformed gas.

Though oxygen in the air is used as the oxidation gas for raising the temperature of the shift catalyst 8, the oxidation gas is not limited thereto, and any chemical species which generate oxidation heat by oxidizing hydrogen and carbon monoxide in the reformed gas can be used as the oxidation gas.

Though platinum (Pt) is used as the catalytic body in the shift catalyst 8 in this embodiment, the catalytic body is not limited thereto, and other noble metals such as palladium (Pd), nickel (Ni), and rhodium (Rh) and transition metals can be used as the catalytic body.

Though the Ce oxide is used as the carrier of the noble metal catalyst in the shift catalyst 8 in this embodiment, the carrier is not limited thereto, and a Ce—Zr composite oxide can be used as the carrier or the Ce oxide may be mixed with an Al oxide to be used as the carrier.

Though the temperature detector 10 is disposed downstream of the shift catalyst 8 in order to detect the temperature of the shift catalyst 8 in this embodiment, the position of the temperature detector 10 is not limited thereto and can be located upstream of the shift catalyst 8. In addition, in the case of changing the position of the temperature detector 10 as described above, it is possible to achieve the same effect by optimizing the reference temperature in accordance with the position after the change.

In some cases, the characteristic curve shown in FIG. 2 might change depending on parameters such as the constitution of the hydrogen generator 100a, the type of the catalytic body of the shit catalyst 8, and the amount of the catalyst. Therefore, it is preferable that the reference temperature is set in accordance with the parameters. Thus, the effect achieved by this embodiment can be achieved also in the case where the parameters are changed.

The air supply from the air supplying unit 15 to the shifter 7 may be performed for the purpose of keeping the temperature of the shift catalyst 8 at a predetermined value, not only for the purpose of increasing the amount of the feed material to be supplied to the reformer 1 in accordance with the increase in power generation amount of the fuel cell. By such operation, though hydrogen consumption is increased in the shifter 7, it is possible to increase a speed of the temperature rise of the shift catalyst 8 in the case of increasing the amount of the feed material.

Though the reference temperatures for the increases in amount of the feed material to be supplied to the reformer by the units of 1.0 NL/min, 2.0 NL/min, 3.0 NL/min, and 4.0 NL/min are set by way of example in this embodiment, a reference temperature for an increase in amount of the feed material by the unit of 0.1 NL/min. may additionally be set.

Second Embodiment

In a hydrogen generator according to the second embodiment, a control program which is stored in a controller 101 to be used for increasing power generation amount is different from that of the hydrogen generator of the first embodiment, and a constitution of hardware of the hydrogen generator is the same as that of the hydrogen generator of the first embodiment. Basic operations of the hydrogen generator performed for generating hydrogen are the same as those of the hydrogen generator of the first embodiment. Therefore, in this embodiment, the constitution of the hardware and the basic operations for generating hydrogen of the hydrogen generator of this embodiment are omitted.

In this embodiment, in the case of increasing an amount of hydrogen to be generated by the hydrogen generator 100a in accordance with an increase in power generation amount of a fuel cell, the controller 101 judges whether or not a temperature detected by a temperature detector 10 has reached a reference temperature in the same manner as in the first embodiment. When it is judged that the detected temperature detected by the temperature detector 10 has reached the reference temperature, an amount of the feed material to be supplied to the reformer 1 is increased. However, when it is judged that the detected temperature has not reached the reference temperature, no operation for raising temperature from the detected temperature to the reference temperature is performed unlike the case with the first embodiment, so that the amount of the feed material to be supplied to the reformer is not increased.

Hereinafter, the operation of the hydrogen generator 100a of this embodiment will be described with reference to FIG. 4. A part of the operations of the hydrogen generator 100a of this embodiment is the same as the steps of Step S1 to Step S4 of the flowchart shown in FIG. 4. When the detected temperature detected by the temperature detector 10 is equal to or higher than the reference temperature (YES in Step S4), the amount of the feed material to be supplied to the reformer 1 is increased in the same manner as in the first embodiment. However, when the detected temperature is lower than the reference temperature (NO in Step S4), the operations of the steps of Step S5 to Step S8 are not performed, so that the amount of the feed material to be supplied to the reformer is not increased.

Thus, according to this embodiment, the amount of the feed material is increased when the detected temperature detected by the temperature detector 10 has reached the temperature equal to or higher than the reference temperature which is responsive to the amount of the feed material to be supplied after the temperature detection, but the amount of the feed material is not increased when the detected temperature has not reached the reference temperature. Consequently, it is possible to prevent a sharp increase in carbon monoxide concentration in the reformed gas.

Third Embodiment

In a hydrogen generator according to the third embodiment, a control program which is stored in a controller 101 to be used for increasing power generation amount is different from that of the hydrogen generator of the first embodiment, and a constitution of hardware of the hydrogen generator is the same as that of the hydrogen generator of the first embodiment. Basic operations of the hydrogen generator performed for generating hydrogen are the same as those of the hydrogen generator of the first embodiment. Therefore, in this embodiment, too, the constitution of the hardware and the basic operations for generating hydrogen of the hydrogen generator of this embodiment are omitted.

In this embodiment, in the case of increasing an amount of hydrogen to be generated by the hydrogen generator 100a in accordance with an increase in power generation amount of a fuel cell, the controller 101 judges whether or not a temperature detected by a temperature detector 10 has reached a reference temperature in the same manner as in the first embodiment. When it is judged that the detected temperature detected by the temperature detector 10 has reached the reference temperature, an amount of the feed material to be supplied to the reformer 1 is increased. Also, operations for raising temperature from the detected temperature to the reference temperature are performed when it is judged that the detected temperature has not reached the reference temperature in the same manner as in the first embodiment. After that, the amount of the feed material to be supplied to the reformer is increased. Here, in this embodiment, when the controller 101 judges that the detected temperature detected by the temperature detector 10 has not reached the reference temperature, a temperature of the reformer 1 is raised by raising a temperature of the heater 5, so that a temperature of the reformed gas discharged from the reformer 1 is raised. Then, the reformed gas thus raised in temperature is supplied to the shifter 7 to raise the temperature of the shift catalyst 8 provided in the shifter 7. A temperature of the reformed gas after passing through the shift catalyst 8 rises after the increase in temperature of the shift catalyst 8, so that the detected temperature to be detected by the temperature detector 10 is raised. Thus, the detected temperature detected by the temperature detector 10 is controlled to reach the reference temperature.

More specifically, in the case of increasing the amount of the feed material to be supplied to the reformer 1 in accordance with an increase in power generation amount of the fuel cell from 1.0 NL/min to 2.0 NL/min., for instance, it is difficult to effectively reduce a carbon monoxide concentration in the reformed gas in the shifter 7 with the detected temperature detected by the temperature detector 10 of 160° C. as is apparent from FIG. 2. Therefore, in this embodiment, in the case where a detected temperature detected by a temperature detector 6 serving to detect a temperature of the reformed gas after passing through the reforming catalyst 2 is 650° C., the temperature of the reformer 1 is raised by the use of the heater 5 so as to raise the detected temperature to be detected by the temperature detector 6 to 660° C. This is realized by increasing an amount of a fuel to be supplied from a fuel supplying unit (not shown in FIG. 1) to the heater 5. As a result, the temperature of the reformed gas which is discharged from the reformer and supplied to the shifter 7 is raised, so that the temperature of the shift catalyst 8 is raised and the detected temperature detected by the temperature detector 10 in the shifter 7 is raised. With the rise in temperature of the shift catalyst 8 in the shifter 7 from lower than 160° C. to 160° C., it is possible to increase the amount of the feed material to be supplied to the reformer from 1.0 NL/min. to 2.0 NL/min. Likewise, in the case of increasing the amount of the feed material from 2.0 NL/min. to 3.0 NL/min., or from 3.0 NL/min. to 4.0 NL/min., the temperature of the reformed gas is raised by raising the temperature of the reformer 1 through the increase in amount of the fuel to the heater 5, and then the amount of the feed material is increased. Thus, it is possible to prevent a sharp increase in carbon monoxide concentration in the reformed gas discharged from the hydrogen generator. Consequently, it is possible to increase the amount of hydrogen generated by the hydrogen generator in accordance with the increase in power generation amount of the fuel cell.

Hereinafter, the operations of the hydrogen generator 100a of this embodiment will be described with reference to FIG. 4. A part of the operations of the hydrogen generator 100a of this embodiment is the same as the steps of Step S1 to Step S4 of the flowchart shown in FIG. 4. When the detected temperature detected by the temperature detector 10 is equal to or higher than the reference temperature (YES in Step S4), the amount of the feed material to be supplied to the reformer 1 is increased in the same manner as in the first embodiment. In turn, when the detected temperature is lower than the reference temperature (NO in Step S4), Step S5 is performed in the same manner as in the first embodiment, and then a predetermined control signal is output from the controller 101 in order to increase the amount of the fuel to be supplied to the heater 5 as Step S6. The temperature of the reformer 1 is raised due to the increase in amount of the fuel to be supplied to the heater 5 by Step S6. After the temperature of the reformed gas has been raised by Step S6 to raise the detected temperature in the shifter 7 detected by the temperature detector 10 to the reference temperature, the increase in amount of the fuel to be supplied to the heater 5 is stopped as Step S7 in order to prevent the fuel to be supplied to the heater 5 from being wasted. Here, the temperature of the reformed gas supplied to the shifter 7 is continuously monitored by the temperature detector 6, so that the fuel is supplied from the fuel supplying unit to the heater 5 as required when the temperature of the reformed gas is below the predetermined temperature. After that, in the same manner as in the first embodiment, a control signal for increasing the amount of the feed material is output from the controller 101 to the feed material supplying unit 3, so that the amount of the feed material to be supplied to the reformer 1 is increased to an amount for coping with the increase in the power generation amount of the fuel cell (Step S8).

As described above, according to this embodiment, the temperature of the reformer 1 is controlled by using the heater 5 so as to control the temperature of the reformed gas which is discharged from the reformer 1 to be supplied to the shifter 7. Thus, the temperature of the shift catalyst 8 is controlled to be the proper reference temperature. As described above, the amount of the feed material to be supplied to the reformer 1 is increased when the detected temperature detected by the temperate detector 10 has reached the reference temperature which is responsive to the amount of the feed material to be supplied after the temperature detection, while the amount of the feed material is increased after controlling the detected temperature to be the reference temperature when the detected temperature has not reached the reference temperature; therefore, it is possible to prevent a sharp increase in carbon monoxide concentration in the reformed gas.

In addition, the control temperature of the detected temperature detected by the temperature detector 6 might be different from the above described one depending on the constitution of the reformer 1 in which the temperature detector 6 is disposed or parameters such as a target transition rate in the reforming reaction. Accordingly, in order to achieve an effect same as that achieved in the first embodiment, the control temperature of the detected temperature detected by the temperature detector 6 may be set to a value optimized in accordance with the constitution of the reformer 1 or the control parameters to be employed.

Fourth Embodiment

In a hydrogen generator according to the fourth embodiment, a control program which is stored in a controller 101 to be used for increasing power generation amount is different from that of the hydrogen generator of the first embodiment, and a constitution of hardware of the hydrogen generator is the same as that of the hydrogen generator of the first embodiment. Basic operations of the hydrogen generator performed for generating hydrogen are the same as those of the hydrogen generator of the first embodiment. Therefore, in this embodiment, too, the constitution of the hardware and the basic operations for generating hydrogen of the hydrogen generator of this embodiment are omitted.

In this embodiment, in the case of increasing an amount of hydrogen to be generated by the hydrogen generator 100a in accordance with an increase in power generation amount of a fuel cell, the controller 101 judges whether or not a temperature detected by a temperature detector 10 has reached a reference temperature in the same manner as in the first embodiment. When it is judged that the detected temperature detected by the temperature detector 10 has reached the reference temperature, an amount of the feed material to be supplied to the reformer 1 is increased. Also, operations for raising temperature from the detected temperature to the reference temperature are performed when it is judged that the detected temperature has not reached the reference temperature in the same manner as in the first embodiment. After that, the amount of the feed material to be supplied to the reformer 1 is increased. Here, in this embodiment, when the controller 101 judges that the detected temperature detected by the temperature detector 10 has not reached the reference temperature, a temperature of the reformer 1 is raised by reducing an amount of water to be supplied from a water supplying unit 4 to the reformer 1, thereby raising a temperature of the reformed gas discharged from the reformer 1. Then, the reformed gas thus raised in temperature is supplied to the shifter 7 to raise the temperature of the shift catalyst 8 provided in the shifter 7. Since a temperature of the reformed gas after passing through the shift catalyst 8 rises by the raised temperature of the shift catalyst 8, the detected temperature detected by the temperature detector 10 is raised. Thus, the detected temperature detected by the temperature detector 10 is controlled to reach the reference temperature.

More specifically, in the case of increasing the amount of the feed material to be supplied to the reformer 1 in accordance with an increase in power generation amount of the fuel cell from 1.0 NL/min to 2.0 NL/min., for instance, it is difficult to effectively reduce a carbon monoxide concentration in the reformed gas in the shifter 7 with the detected temperature detected by the temperature detector 10 of 160° C. as is apparent from FIG. 2. Therefore, in this embodiment, in the case where a detected temperature detected by a temperature detector 6 serving to detect the temperature of the reformed gas after passing through the reforming catalyst 2 is 650° C., the detected temperature to be detected by the temperature detector 6 is raised to 660° C. by raising the temperature of the reformer 1 through the reduction in amount of water to be supplied from the water supplying unit 4 to the reformer 1. As a result, owing to the rise in temperature of the reformed gas which is discharged from the reformer 1 and supplied to the shifter 7, the temperature of the shift catalyst 8 is raised to raise the detected temperature to be detected by the temperature detector 10 in the shifter 7. With the rise in temperature of the shift catalyst 8 in the shifter 7 from lower than 160° C. to 160° C., it is possible to increase the amount of the feed material to be supplied to the reformer 1 from 1.0 NL/min. to 2.0 NL/min. In addition, in the case of increasing the amount of the feed material from 2.0 NL/min. to 3.0 NL/min., or from 3.0 NL/min. to 4.0 NL/min., the same operations are performed.

Hereinafter, the operations of the hydrogen generator 100a of this embodiment will be described with reference to FIG. 4. A part of the operations of the hydrogen generator 100a of this embodiment is the same as the steps of Step S1 to Step S4 of the flowchart shown in FIG. 4. When the detected temperature detected by the temperature detector 10 is equal to or higher than the reference temperature (YES in Step S4), the amount of the feed material to be supplied to the reformer 1 is increased in the same manner as in the first embodiment. In turn, when the detected temperature is less than the reference temperature (NO in Step S4), Step S5 is executed in the same manner as in the first embodiment, and then a predetermined control signal is output from the controller 101 to reduce the amount of water to be supplied to the reformer 1 as Step S6. The temperature of the reformer 1 is raised because the amount of water to be supplied to the reformer 1 is reduced by Step S6. After the temperature of the reformed gas has been raised by Step S6 to raise the detected temperature detected by the temperature detector 10 in the shifter 7 to the reference temperature, the reduction in amount of water to be supplied to the reformer 1 is stopped as Step S7 in order to prevent an excessive increase in temperature of the reformed gas. Here, the temperature of the reformed gas which is discharged from the reformer 1 and supplied to the shifter 7 is continuously monitored by the temperature detector 6, so that the water supplied from the water supplying unit 4 to the reformer 1 is reduced as required when the temperature of the reformed gas is below the predetermined temperature. Thus, the temperature of the shift catalyst 8 in the shifter 7 is kept at the reference temperature. Subsequent operations are the same as those described in the first and the third embodiments.

As described above, according to this embodiment, the temperature of the reformer 1 is controlled through the control on the amount of water to be supplied from the water supplying unit 4 to the reformer 1. Then, by the control on the temperature of the reformed gas which is discharged from the reformer 1 to be supplied to the shifter 7, the temperature of the shift catalyst 8 is controlled to be the proper reference temperature. Other characteristics are the same as those of the first and the third embodiments.

Fifth Embodiment

In a hydrogen generator according to the fifth embodiment, a control program which is stored in a controller 101 to be used for increasing power generation amount is different from that of the hydrogen generator of the first embodiment, and a constitution of hardware of the hydrogen generator is the same as that of the hydrogen generator of the first embodiment. Basic operations of the hydrogen generator performed for generating hydrogen are the same as those of the hydrogen generator of the first embodiment. Therefore, in this embodiment, too, the constitution of the hardware and the basic operations for generating hydrogen of the hydrogen generator of this embodiment are omitted.

In this embodiment, in the case of increasing an amount hydrogen to be generated by the hydrogen generator 100a to realize the increase in power generation amount of a fuel cell, the controller 101 judges whether or not a detected temperature detected by a temperature detector 14 disposed in a purifier 11 has reached a predetermined reference temperature in the same manner as in the first embodiment. When it is judged that the detected temperature detected by the temperature detector 14 has reached the predetermined reference temperature, an amount of the feed material to be supplied to the reformer 1 is increased. However, when it is judge that the detected temperature detected by the temperature detector 14 in the purifier 11 has not reached the predetermined reference temperature, no operation for raising temperature from the detected temperature to the reference temperature is performed as is the case with the second embodiment, so that the amount of the feed material to be supplied to the reformer is not increased.

Hereinafter, characteristics of the selective oxidation reaction in the purifier 11 will be described with reference to the drawings.

Figure 3:
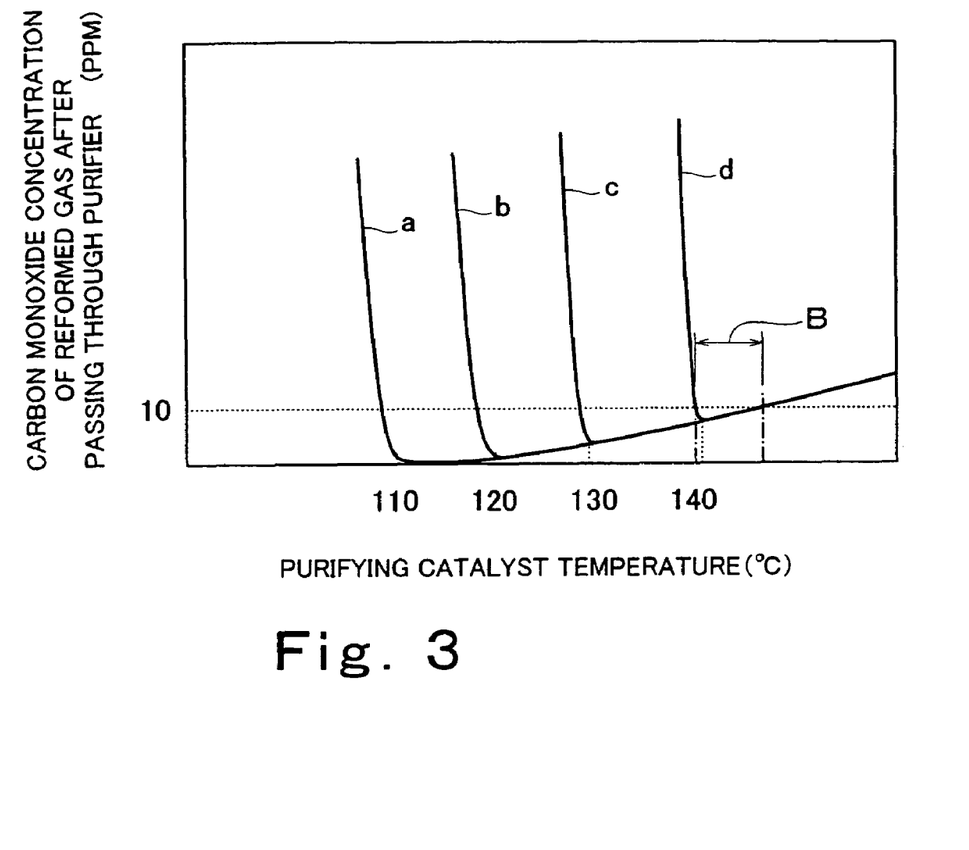
FIG. 3 is a graph showing a relationship between a shift catalyst temperature for a feed material amount and a carbon monoxide concentration in a reformed gas after passing through a purifier.

FIG. 3 is a graph showing a relationship between a purifying catalyst temperature for a feed material amount and a carbon monoxide concentration in the reformed gas after passing through the purifier. In FIG. 3, the vertical axis indicates the carbon monoxide concentration (ppm) contained in the reformed gas after passing through the purifier, and the horizontal axis indicates the purifying catalyst temperature (° C.) in the purifier. The curve a indicates the relationship when the feed material amount is 1.0 NL/min.; the curve b indicates the relationship when the feed material amount is 2.0 NL/min.; the curve c indicates the relationship when the feed material amount is 3.0 NL/min.; and the curve d indicates the relationship when the feed material amount is 4.0 NL/min.

As shown in FIG. 3, the carbon monoxide concentration contained in the reformed gas after undergoing the selective oxidation reaction in the purifier 11 depends on the temperature of the purifying catalyst 12 and the amount of the feed material. For instance, in the case where the amount of the feed material supplied to the reformer 1 is small as indicated by the curve a (1.0 NL/min.), carbon monoxide is effectively reduced even when the purifying catalyst 12 is in a low temperature state (110° C., for example). In turn, in the case where the amount of the feed material supplied to the reformer 1 is large as indicated by the curve d (4.0 NL/min.), carbon monoxide is scarcely reduced when the purifying catalyst 12 is in the low temperature state (130° C. or lower, for example).

That is to say, even when the temperature of the purifying catalyst 12 is lowered due to the reduction in amount of the reformed gas supplied from the shifter 7 to the purifier 11 caused by the reduction in amount of the feed material supplied to the reformer 1 responsive to the reduction in power generation amount of the fuel cell, it is possible to sufficiently reduce the carbon monoxide concentration in the reformed gas when the amount of the feed material supplied to the reformer 1 is 1.0 NL/min. (curve a) and the temperature of the purifying catalyst 12 is 110° C. More specifically, in the case where the carbon monoxide concentration in the reformed gas after the selective oxidation reaction in the purifier 11 is 10 ppm or lower as indicated by the dotted line in FIG. 3, it is possible to achieve the desired carbon monoxide concentration in the range of the temperature of the purifying catalyst 12 of about 110° C. to about 140° C. Also, when the amount of the feed material supplied to the reformer 1 is 2.0 NL/min. (curve b), the effective range of the temperature of the purifying catalyst 12 is from about 120° C. to about 140° C. Also, when the amount of the feed material supplied to the reformer 1 is 3.0 NL/min. (curve c), the effective range of the temperature of the purifying catalyst 12 is from about 130° C. to about 140° C. Also, when the amount of the feed material supplied to the reformer 1 is 4.0 NL/min. (curve d), the effective range of the temperature of the purifying catalyst 12 is the range B shown in FIG. 3. However, in the case where the amount of the feed material supplied to the reformer 1 has become 3.0 NL/min. (curve c) in accordance with the reduction in power generation amount of the fuel cell to reduce the temperature of the purifying catalyst 12 to lower than 140° C., unless the temperature of the purifying catalyst 8 immediately reaches a temperature in the temperature range B, the carbon monoxide concentration in the reformed gas undesirably exceeds the target value of 10 ppm when the amount of the feed material supplied to the reformer 1 is increased to 4.0 NL/min. (curve d), for example, for the purpose of increasing the power generation amount of the fuel cell. Therefore, when it is required to increase the amount of the feed material to be supplied to the reformer 1 of the hydrogen generator 100a in accordance with the increase in power generation amount of the fuel cell, it is necessary to judge whether or not the temperature of the purifying catalyst 12 is in the temperature range optimum for the amount of the feed material after the increase.

In view of the above, in this embodiment, in the case of coping with the increase in power generation amount of the fuel cell, it is judged, in advance of the actual increase in amount of the feed material to be supplied to the reformer 1 of the hydrogen generator 100a, whether or not the detected temperature detected by the temperature detector 14 disposed in the purifier 11 has reached the optimum temperature (hereinafter referred to as second reference temperature) for progressing the selective oxidation reaction with good yield after increasing the amount of the feed material, so that the amount of the feed material to be supplied to the reformer 1 is increased when it is judge that the temperature of the purifying catalyst 12 has reached the second reference temperature. In turn, when it is judged that the detected temperature detected by the temperature detector 14 in the purifier has not reached the second reference temperature, the operations for raising temperature from the detected temperature to the second reference temperature are not performed as is the case with second embodiment, so that the amount of the feed material to be supplied to the reformer 1 is not increased.

Hereinafter, the operations of the hydrogen generator 100a of this embodiment will be described with reference to the drawings. A part of the operations of the hydrogen generator 100a of this embodiment is basically the same as the steps of Step 1 to Step 4 of the flowchart shown in FIG. 4. Note that the detected temperature detected by the temperature detector 14 disposed in the purifier is stored in Step S1. Also, in Step S3, the second reference temperature is set in accordance with the amount of the feed material predicted in Step S2. At this time point, data for the graph shown in FIG. 3, for example, have been stored in a storage unit of the controller 101. In the case of maintaining the carbon monoxide concentration in the reformed gas after passing through the purifier 11 to 10 ppm or lower, for example, the second reference temperature set by the controller 101 is in the temperature range B when the amount of the feed material supplied to the reformer 1 is 4.0 NL/min. (curve d) of FIG. 3. Then, in view of the fact that the selective oxidation reaction progressing in the purifier 11 is an exothermic reaction, it is desirable that the second reference temperature should be set as a temperature in a low temperature portion of the temperature range B. As is apparent from FIG. 3, the temperature in the low temperature portion of the temperature range B is optimum for effectively reducing the carbon monoxide concentration in the reformed gas. For instance, as is apparent from FIG. 3, when it is predicted that the amount of the feed material to be supplied to the reformer 1 is 4.0 NL/min. (curve d), the second reference temperature optimum for reducing carbon monoxide in the reformed gas is 140° C. Then, In Step S4 of FIG. 4, the detected temperature detected by the temperature detection unit 14 is compared with the second reference temperature set by Step S3. In the case where it is confirmed that the detected temperature detected by the temperature detector 14 has reached the second reference temperature as a result of the comparison in Step S4 (YES in Step S4), the amount of the feed material to be supplied to the reformer 1 is increased in the same manner as in the first embodiment. However, when it is confirmed that the detected temperature detected by the temperature detector 14 has not reached the second reference temperature (NO in Step S4), the operations corresponding to the steps of Step S5 to Step S8 are not performed, so that the amount of the feed material to be supplied to the reformer is not increased.

As described above, according to this embodiment, the amount of the feed material to be supplied to the reformer 1 is increased when the detected temperature detected by the temperature detector 14 has reached the second reference temperature which is in accordance with the amount of the feed material after the temperature detection, while the amount of the feed material is not increased when the detected temperature has not reached the second reference temperature. Thus, it is possible to prevent a sharp increase in carbon monoxide concentration in the reformed gas.

Though the second reference temperatures for the increases in amount of the feed material supplied to the reformer by the units of 1.0 NL/min, 2.0 NL/min, 3.0 NL/min, and 4.0 NL/min are set by way of example in this embodiment, a reference temperature for an increase in amount of the feed material by the unit of 0.1 NL/min. may additionally be set.

Though a mixture of Pt and Ru is used as the catalytic body in the purifying catalyst 12 in this embodiment, the catalytic body is not limited thereto, and Pt or Ru can independently be used as the catalytic body or other noble metals such as Pd can be used as the catalytic body.

Though alumina is used as the carrier of the purifying catalyst 12 in this embodiment, the carrier is not limited thereto, and silica or a mixture of alumina and silica can be used as the carrier.

In some cases, the characteristic curve shown in FIG. 3 might change depending on parameters such as the constitution of the hydrogen generator 100a, the type of the catalytic body of the purifying catalyst 12, and the amount of the catalyst. Therefore, it is preferable that the reference temperature is set in accordance with the parameters. Thus, the effect achieved by this embodiment can be achieved also in the case where the parameters are changed.

Though the temperature detector 14 is disposed downstream of the purifying catalyst 12 in order to detect the temperature of the purifying catalyst 12 in this embodiment, the position of the temperature detector 14 is not limited thereto and can be located upstream of the purifying catalyst 12. Alternatively, the temperature detector 14 may be disposed in the purifier 12 to directly detect the temperature of the purifying catalyst 12. In addition, in the case of changing the position of the temperature detector 14 as described above, it is possible to achieve the same effect by optimizing the second reference temperature in accordance with the position after the change.

This embodiment may be modified in such a manner that the temperature of the purifying catalyst 12 is raised by raising the temperature of the reformed gas in order to cope with the increase in amount of hydrogen to be generated as described in the third embodiment. Alternatively, this embodiment may be modified in such a manner that the temperature of the purifier 12 is raised by reducing the amount of water to be supplied to the reformer 1 in order to cope with the increase in amount of hydrogen to be generated as described in the fourth embodiment.

Alternatively, this embodiment may be combined with any one of the first, the third, and the fourth embodiments in such a manner that the reference temperature is set as a temperature of the shift catalyst 8. With such combined embodiment, it is possible to more reliably suppress the generation of carbon monoxide when increasing the amount of hydrogen to be generated in accordance with the increase in power generation amount of the fuel cell.

Sixth Embodiment

Figure 5:
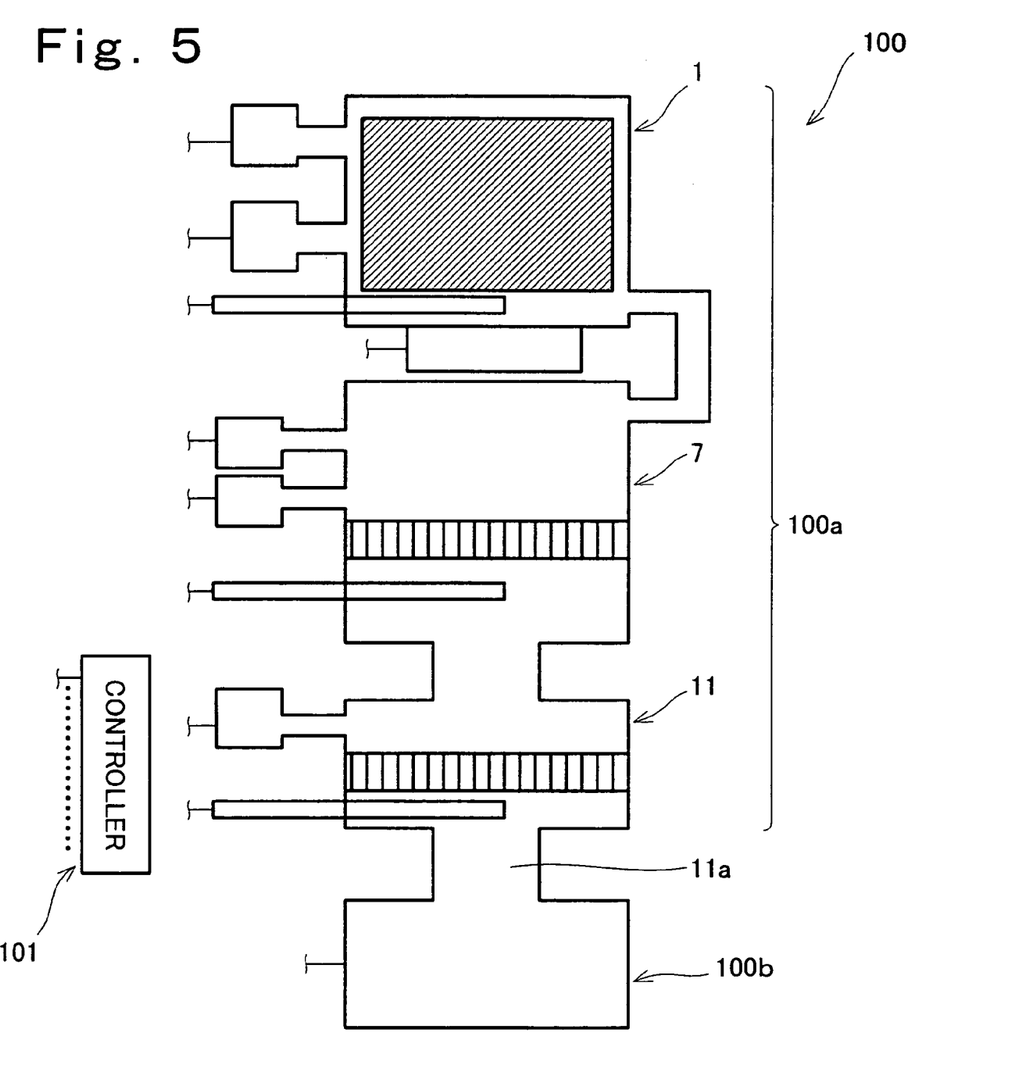
FIG. 5 is a schematic diagram showing a constitution of a fuel cell system having one of the hydrogen generators according to the first to the fifth embodiments of the invention.

FIG. 5 is a schematic diagram showing a constitution of a fuel cell system having one of the hydrogen generators according to the first to the fifth embodiments of the invention. Note that the reference numerals of the components constituting the hydrogen generator are omitted in FIG. 5.

As shown in FIG. 5, the fuel cell system 100 of the sixth embodiment is provided with a hydrogen generator 100a which is any one of the hydrogen generators according to the first to the fifth embodiments, a fuel cell 100b for generating power using the reformed gas and the air supplied from the hydrogen generator 100a, and the controller 101 for controlling operations of the hydrogen generator 100a and the fuel cell 100b. In addition, though not shown in FIG. 5, the fuel cell system 100 has the air supplier for supplying to the fuel cell 100b the air to be used for the power generation.

Also, as shown in FIG. 5, the hydrogen generator 100a and the fuel cell 100b are connected to each other via the reformed gas piping 11a. The air supplier and the fuel cell 100b are connected to each other via a predetermined piping not shown in FIG. 5. The control wirings extending from the controller 101 are connected to the reformer 1, the shifter 7, the purifier 11, the components of the reformer 1, the shifter 7, and the purifier 11, and the fuel cell 100b.

In the case of generating power by operating the fuel cell system 100 shown in FIG. 5, the reformed gas rich in hydrogen is supplied from the hydrogen generator 100a to the fuel cell 100b simultaneously with supplying the air from the air supplier. Then, power is generated in the fuel cell 100b by using hydrogen contained in the reformed gas supplied from the hydrogen generator 100a and oxygen contained in the air supplied from the air supplier. In addition, the controller 101 controls operations of the fuel cell system 100 of this embodiment as required.

In this embodiment, in the case of coping with a change in load on the fuel cell system from a lower load to a higher load, i.e., in the case of increasing a power generation amount of the fuel cell 100b in order to cope with the change in load, the operations of the hydrogen generator are controlled as described in the first to the fifth embodiments, so that an amount of the reformed gas to be supplied to the fuel cell 100b is increased. Thus, the power generation amount of the fuel cell 100b is increased.

As described above, according to this embodiment, in the case of increasing the amount of the feed material to be supplied to the reformer 1 shown in FIG. 1 to thereby increase an amount of hydrogen to be generated by the hydrogen generator so as to increase the power generation amount of the fuel cell 100b, a high quality reformed gas which is reduced in carbon monoxide concentration is supplied to the fuel cell 100b in a sufficient amount without fail. Therefore, a reduction in output power of the fuel cell 100b otherwise caused by poisoning of an electrode catalyst disposed inside the fuel cell 100b with carbon monoxide is effectively prevented. Also, the fuel cell 100b continues to generate power without fail.

From the above description, many modifications and alternatives will be apparent to those skilled in the art. Therefore, the above description should be understood only by way of example and has been given for the purpose of teaching those skilled in the art the best mode of embodiment for carrying out the invention. The details of the constitution and/or the function of the invention can substantially be changed without departing from the spirit of the invention.

What is claimed is:

1. A hydrogen generator comprising:
   a reformer operable to generate a reformed gas containing hydrogen from a feed material comprising an organic compound containing at least carbon and hydrogen, and water;
   a heater operable to heat said reformer to a temperature required for generating the reformed gas;
   a carbon monoxide reducing unit having a carbon monoxide reducing catalyst and being operable to reduce carbon monoxide contained in the reformed gas generated in said reformer;
   a temperature detector operable to detect at least one of a temperature of the reformed gas in said carbon monoxide reducing unit and a temperature of the carbon monoxide reducing catalyst; and
   a controller that controls an increase in an amount of the feed material to be supplied to said reformer based on a comparison between a temperature detected by said temperature detector and a reference temperature which is set according to the amount of the feed material.

2. The hydrogen generator according to claim 1, wherein said controller is operable to perform control so that the amount of the feed material to be supplied to said reformer is not increased when the detected temperature is lower than the reference temperature as a result of the comparison, and wherein the amount of the feed material is increased when the detected temperature is at least equal to the reference temperature.

3. The hydrogen generator according to claim 2, wherein said controller is operable to:
   perform control so that the detected temperature reaches a temperature at least equal to the reference temperature when the detected temperature is lower than the reference temperature; and
   perform control so that the amount of the feed material is increased when the detected temperature reaches the temperature at least equal to the reference temperature.

4. The hydrogen generator according to claim 3, wherein said controller is further operable to perform control so that heating calories in said heater is increased to raise the detected temperature to a temperature at least equal to the reference temperature when the detected temperature is lower than the reference temperature.

5. The hydrogen generator according to claim 3, wherein said controller is further operable to perform control so that the water to be supplied to said reformer is reduced in an amount to raise the detected temperature to a temperature at least equal to the reference temperature when the detected temperature is lower than the reference temperature.

6. The hydrogen generator according to claim 3, further comprising an oxidation gas supplying unit operable to supply an oxidation gas to said carbon monoxide reducing unit, wherein said controller is further operable to perform control so that the oxidation gas is supplied from said oxidation gas supplying unit to said carbon monoxide reducing unit to raise the detected temperature to a temperature at least equal to the reference temperature when the detected temperature is lower than the reference temperature.

7. The hydrogen generator according to claim 1, wherein:
said carbon monoxide reducing catalyst is a shift catalyst operable to progress a water gas shift reaction through which hydrogen and carbon dioxide are generated from carbon monoxide and water; and
said carbon monoxide reducing unit is a shifter having the shift catalyst.

8. The hydrogen generator according to claim 7, wherein a catalytic body in the shift catalyst comprises at least a noble metal and a metallic oxide of at least one element selected from cerium, zirconium, and aluminum.

9. The hydrogen generator according to claim 1, wherein:
said carbon monoxide reducing catalyst is a carbon monoxide selective oxidation catalyst operable to subject carbon monoxide to a selective oxidation reaction; and
said carbon monoxide reducing unit is a selective oxidation unit having the carbon monoxide selective oxidation catalyst.

* * * * *